March 11, 1969     W. H. ATKINSON     3,431,795
DISCONNECTABLE DRIVE MEANS FOR SHAFTS
Filed April 27, 1967
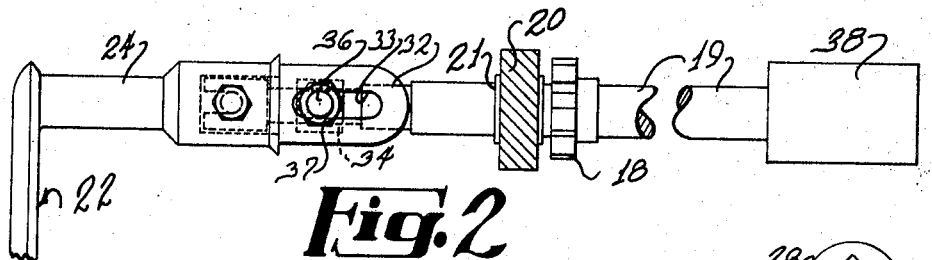
Fig. 2
Fig. 6
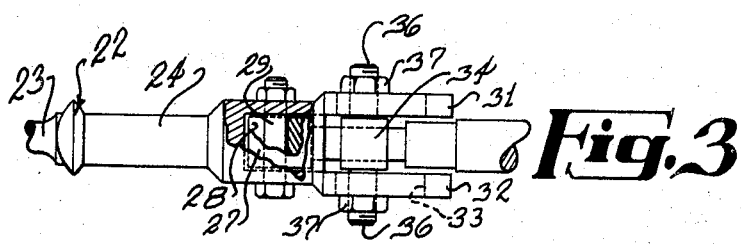
Fig. 3
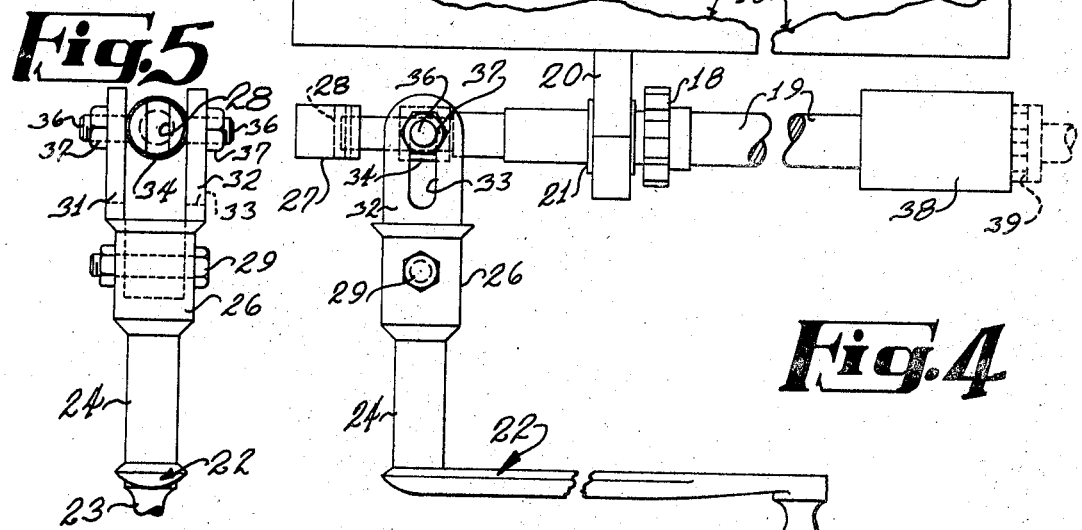
Fig. 5
Fig. 4
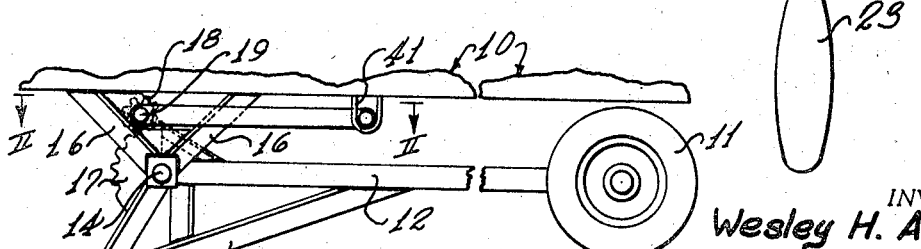
Fig. 1
INVENTOR.
Wesley H. Atkinson
BY
Jennings Carter & Thompson
Attorneys

United States Patent Office 3,431,795
Patented Mar. 11, 1969

3,431,795
DISCONNECTABLE DRIVE MEANS FOR SHAFTS
Wesley H. Atkinson, P.O. Box 1184,
Montgomery, Ala. 36102
Filed Apr. 27, 1967, Ser. No. 634,318
U.S. Cl. 74—545                                    3 Claims
Int. Cl. G05g 1/12

ABSTRACT OF THE DISCLOSURE

A drive for a shaft in which the shaft is provided with a tool or tool seat on one end, together with a crank or similar member having a seat or tool cooperable with that on the end of the shaft, the crank or similar member being selectively adapted to idle about the shaft while it is rotated by other means or to be engaged endwise with the shaft for rotating it.

---

This invention relates to means for driving shafts and has for its principal object the provision of quick disconnectable means, permanently attached to the shaft, by means of which it may be rotated.

In this art there are various instances in mechanics where it is desired to rotate a shaft either manually or by power means. Further, there are instances where it is desired that the manual operating means, when inoperative, not increase the overall length of the shaft as, for instance, when such arrangement is employed in the raising and lowering of landing gear of trailers wherein, when inoperative, the overall width of the trailer cannot be increased beyond certain legal limits.

Briefly, my invention comprises a manually operable member in the form of a crank which is adapted to be attached at its inner end to a sleeve rotatably mounted on the shaft adjacent an end thereof. Projecting from the sides of the sleeve are studs or the like. The crank is provided with a tubular end section or member having spaced apart legs provided with slots adapted slideably to receive the studs projecting from the sleeve. The parts are so dimensioned that the crank end which is slideably attached to the studs may be brought into alignment with the shaft and coupled thereto, or, when not in use, may hang by gravity from the studs. In the first mentioned position power may be applied through the crank to the shaft for rotating it; in the second named position power may be applied to the shaft by any other means and the entire crank will idle on the shaft since it is supported therefrom by the sleeve.

Apparatus illustrating features of my invention is shown in the accompanying drawings forming a part of this application, in which:

FIG. 1 is a wholly diagrammatic, fragmental view illustrating my invention as applied to the landing gear of a highway trailer;

FIG. 2 is a view taken generally along line 2—2 of FIG. 1, drawn to a larger scale, certain of the parts being broken away and in section;

FIG. 3 is a side elevational view of a portion of the mechanism shown in FIG. 2, certain parts being broken away and in section;

FIG. 4 is a fragmental side elevational view, certain parts being broken away and in section and showing the crank in idling or disengaged position;

FIG. 5 is an end view of the apparatus in the position of FIG. 4 with certain parts omitted for the sake of clarity; and, FIG. 6 is an end view of a tool seat which may be provided on the opposite end of the shaft from the crank whereby a power tool may be readily connected to the shaft for rotating it.

Referring now to the drawings for a better understanding of my invention, in FIG. 1 I show at 10 a fragment of a portion of the usual highway trailer provided with the front landing gear indicated by the wheel 11 and the movable framework 12 therefor. As is customary, the entire framework including the brace member 13 is pivoted on a cross shaft 14 supported from beneath the trailer by frame members 16. A gear or the like 17 is fixed to the shaft and is in mesh with a pinion 18 secured on a shaft 19, the pinion being always in mesh with the gear. It will be apparent that upon rotating shaft 19 the landing gear may be raised and lowered.

As will be understood, the shaft 19 is supported in suitable bearings 21 carried by depending brackets 20 projecting below the level of the trailer body 10.

My invention comprises, in the embodiment shown, a a crank indicated generally by the numeral 22 which has the usual handle 23. The crank arm 24 is provided with a tubular member 26. The tubular member or socket 26 is of a size to fit slideably over and receive an enlarged end 27 on a shaft 19, and the outer end face of the enlarged end 27 is provided with a kerf 28. A tool which may be in the form of a bolt 29 passes through the socket 26, intermediate the ends thereof so that when the socket is slipped over the end 27 bolt 29 engages the kerf 28 and locks handle to the shaft.

It will be noted that the socket member 26 is bifurcated to provide a pair of legs 31 and 32. Furthermore, the legs 31 and 32 are provided with elongated slots 33.

Mounted rotatably about the shaft, near the enlarged end 27 thereof is a sleeve 34. Projecting outwardly of the sleeve 34 are threaded studs 36 and the studs pass slideably through the slots 33 of the legs 32. Nuts 37 hold the parts assembled.

The method of using my improved apparatus together with the advantages thereof may now be more fully explained and understood. When the trailer is being towed along the highway the landing gear 11 is in raised position. This is accomplished by rotating the shaft 14 through the gear 17 and pinion 18, and by locking the parts in up position, by means not shown. Around certain locations the drivers are provided with power tools which may be used to raise and lower the landing gear. Thus, I propose to provide the opposite end of the shaft with a socket 38 to receive the tool end 39 from the power tool, not shown, the end 39 being shown in dotted lines in FIG. 4.

Let it be assumed that the landing gear is to be lowered without benefit of any power tool. With the parts in the position of FIG. 1, wherein the crank normally would be simply hanging down by gravity as shown in FIG. 4, the crank is moved outwardly until the socket member aligns with the enlarged end 27. This is permitted due to the relative dimensional relationship of the slots 33, the location of the studs relative to the end of the shaft and the length of the legs 31 and 32. By moving the socket member 26 of the crank into axial alignment with shaft 19 and pushing it inwardly bolt 29 is engaged into the kerf 28 of the end 27 of the shaft, thus locking the crank in power transmitting relation to the shaft. The gear now is lowered by rotating the crank.

In highway transport position, as stated, the crank simply hangs down by gravity as shown in FIG. 4 or, it may be kept from swinging to and fro by means of a strap or the like 41 of flexible material.

Assuming that the gear is to be operated by a power tool, the tool is simply attached to the end 38 permitting the crank to remain in a disengaged position. Since the shaft is freely rotatable relative to sleeve 34, the crank simply idles on the shaft while the power driven tool is being used to rotate the shaft.

While I have shown my invention as being particularly adapted for use with the raising and lowering of landing gear of truck trailers, it will be apparent that it is capable of use in many instances. Furthermore, while I have shown the kerf or tool seat as being on the end of the shaft as at 27 and the tool in the form of the socket 26 and bolt 29 on the handle, it is apparent that these parts may be reversed.

In view of the foregoing it will be apparent that I have devised an improved, captive handle for a shaft which may be used selectively manually to rotate the shaft or, which when the shaft is power driven, idles relative to the shaft. The sleeve 34 may be axially slideable on the shaft 19 as well as rotatable relative thereto, thereby to reduce the length of the arms 32 and the slots 33.

While I have shown my invention in but one form, it will be obvious to those skilled in the art that it is not so limited, but is susceptible of various other changes and modifications without departing from the spirit thereof.

What I claim is:

1. In disconnectable drive means for a shaft having a tool seat on one end,
    (a) a sleeve surrounding the shaft with a rotating fit adjacent the tool seat end thereof and in which the shaft rotates freely,
    (b) a pair of studs projecting outwardly and laterally of the sleeve generally normal to the longitudinal axis of the shaft,
    (c) a member having a bifurcated end providing legs adapted to lie alongside the tool seat end of the shaft and having axially elongated slots in the legs thereof in which said studs are slideably received,
    (d) a tool carried by said member disposed when the member is axially aligned with the shaft to engage the tool seat whereby power applied to said member is transmitted to the shaft, and
    (e) said slots and said studs being relatively dimensioned and positioned with respect to the said end of the shaft for said member to be selectively coupled to said shaft and to assume a disconnected position relative thereto generally at right angles to the longitudinal axis of the shaft with said sleeve surrounding said shaft with said rotating fit.

2. Apparatus as defined in claim 1 in which the tool seat on the end of the shaft is a kerf cut into the end face of the shaft, said member being a tubular member adapted to slide over the said end of the shaft and said tool being a cross member located inwardly of the tubular member disposed to engage in said kerf, thereby to couple the member and shaft together.

3. Apparatus as defined in claim 1 in which said member has connected to the outer end thereof a manually operable crank.

References Cited

UNITED STATES PATENTS

| | | | |
|---|---|---|---|
| 1,508,812 | 9/1924 | L'evesque | 74—547 |
| 1,941,214 | 12/1933 | Kusterle | 74—544 |
| 3,321,998 | 5/1967 | Haney | 74—547 |

FOREIGN PATENTS

| | | |
|---|---|---|
| 266,601 | 12/1927 | Italy. |
| 974,946 | 10/1950 | France. |
| 457,205 | 11/1936 | Great Britain. |

FRED C. MATTERN, Jr., *Primary Examiner.*

W. S. RATLIFF, Jr., *Assistant Examiner.*